Aug. 1, 1961

J F. BUCY, JR., ET AL 2,994,851

DATA PROCESSING SYSTEM

Filed Oct. 3, 1955

INVENTORS
J. FRED BUCY, JR.,
HAL J. JONES,
JOHN A. MORRISON, JR. AND
LUVERNE J. SPIEKER

BY *Stevens, Davis, Miller and Mosher*

ATTORNEYS

FIG. 2

INVENTORS
J. FRED BUCY, JR.,
HAL J. JONES,
JOHN A. MORRISON, JR. AND
LUVERNE J. SPIEKER
BY Stevens, Davis, Miller & Mosher
ATTORNEYS

United States Patent Office 2,994,851
Patented Aug. 1, 1961

2,994,851
DATA PROCESSING SYSTEM
J Fred Bucy, Jr., Hal J. Jones, John A. Morrison, Jr., and Luverne J. Spieker, Dallas, Tex., assignors to Texas Instruments Incorporated, Dallas, Tex., a corporation of Delaware
Filed Oct. 3, 1955, Ser. No. 538,062
12 Claims. (Cl. 340—15)

This invention relates to methods and apparatus for processing data into a more usable form. More specifically, this invention relates to methods and apparatus for making static and dynamic time delay corrections to magnetically recorded seismic data whereby each trace of seismic data may be aligned with respect to a reference trace and directly transferred to a cross-section chart in time corrected form.

The purpose of any seismic surveying operation is, of course, to locate subsurface reflecting layers and changes in elevation of such layers since it has been found by experience that oil, gas and other minerals are most likely to occur underneath dome-like subsurface formations or at faults where the reflecting layer has shifted relatively on either side of the fault. The most commonly used method of seismic surveying is to place an explosive charge either on or above the surface of the earth or in a hole drilled in the earth and then lay out a spread of seismometers on the surface of the earth at a predetermined and known position in relation to the shot-point. The seismometer spread is made up of a number of seismometer stations, for example twenty-four, with an equal spacing between each station. On detonating the charge, the generated waves travel into the earth and are reflected back to the seismometers from layers where a change in velocity occurs. The reflected waves are received at the seismometers and converted into electrical signals which are then amplified and recorded on a visible or reproducible type record. The recording equipment, whether it is equipment producing visual type or reproducible type records, runs at a constant speed and consequently, the records produced are presented in amplitude versus time form. Knowing the velocity of the waves in the earth and the time required for the generated waves to travel from the shot-point to the reflecting strata and back to the seismometers, it is possible to compute the depth of such reflecting strata.

The records thus produced are not directly usable for depth determinations, however, until certain corrections have been made. These corrections are the elevation correction, weathering correction, and normal moveout correction. The elevation correction factor is introduced into a seismic record by virtue of the differences in elevation of the terrain over which the seismic spread is laid. In order to make this elevation correction, it is necessary to pick the elevation of one seismometer as the reference point and correct the other seismometer elevations to the reference elevation. The second correction is due to the fact that the surface layer of the earth, known as the weathered layer, is comprised of loose, unconsolidated material which has been eroded and/or filled and subjected to the effects of wind, rain, etc. The velocity of waves travelling in this layer is much lower than in the deeper, consolidated earth layers and, consequently, unless correction is made for this low velocity weathered layer, a reflecting layer will appear to be much deeper than its actual depth. The elevation and weathering corrections are in general constant along each given trace of the record although they may differ from trace to trace across the record. Because of the constant character of these corrections along a given record trace, they will hereinafter be referred to as the static time correction.

Normal moveout, the third correction made to a seismic record, results from the fact that the various seismometers in a spread are located at different distances from the shot-point. Thus, the reflected waves arriving at the seismometer next adjacent to the shot-point travel through a shorter distance and for a shorter time than do the waves arriving at the next seismometer, and so on. In order to correct a seismic record for normal moveout, it is necessary to convert all reflected wave travel times to vertical travel times. This is done by assuming the reflecting stratum vertically underneath the shot-point is horizontal and computing moveout times by various formulas which involve the following quantities:

$x$=shot to seismometer horizontal distance,
$z$=depth of reflecting stratum, and
$V$=average vertical velocity.

A simple example of one of these normal moveout formulas is:

$$\Delta t = \frac{\sqrt{x^2+4z^2}-2z}{V}$$

where $\Delta t$=normal moveout time.

When all of the record traces have been corrected to vertical travel times by removing the normal moveout times, it is then possible to determine whether the reflecting stratum is horizontal or has a dip-angle. As can be seen from the normal moveout time formula, the $x$ distance becomes increasingly less significant as the $z$ distance increases and, consequently $\Delta t$ becomes increasingly smaller with record time along each trace. Due to the changing character of the normal moveout time along each record, the normal moveout correction will hereinafter be referred to as the dynamic time correction.

Static and dynamic time corrections have been made for the most part by seismologists computing by hand the corrections to be made to each trace in order to bring all the record traces into alignment. However, with the advent of magnetic recording into the field of seismic surveying, these corrections have been made in the recording process by a mechanical arrangement controlling the physical relation of the recording heads to each other. This mechanical configuration permits the recording head for each seismometer trace to be displaced physically along the recording medium in order to introduce the time delay occasioned by the two types of time corrections. Such a mechanical displacement of the recording heads, through, necessarily requires a complicated head control mechanism and, in addition, may introduce distortion in the record while making the dynamic time correction. The present invention has been conceived to replace the tedious and time consuming hand-operations necessary to time-correct statically and dynamically a seismic record and to provide an electronic time-correcting means in place of the complicated and distortion producing mechanical head shifting arrangement.

In this invention, the static and dynamic time corrections are made by means of a magnetic recording delay line and associated electronic apparatus. In essence, the delay line consists of two drums edge-coated with a magnetic oxide material and each provided with a recording head, an erase head, and a number of detecting heads equally spaced around its periphery. The first drum is rotated at a constant speed and, because the detecting heads are spaced from each other and from the recording head, each detecting head represents a finite amount of time delay. The recording head of the first drum sequentially records traces of seismic signals which have been reproduced from a magnetic recording of seismic data. Individual inhibit and gate circuits are provided in connection with each detecting head so that recorded signals cannot be fed out of the delay line unless the gate circuit for a particular detecting head is in a condition to conduct such signals. Depending upon which one of the detecting head gating circuits is in a conductive condition, the seismic data recorded by the recording head is delayed by a time corresponding to the spacing of the detecting head from the recording head and the detected signals are then fed to the second drum. The second drum of the delay line is completely identical to the first drum except that it rotates at a different constant speed and, thus, the detecting heads spaced around the drum provide a different finite amount of delay time. The signals from the second drum may be fed either to an unused trace of the magnetic seismic recording and then visually recorded on a seismogram cross-sectional chart or recorded directly on the visual type chart. When the signals are recorded directly on the visual type chart, the two drums will provide a complete set of heads and associated circuitry for each trace of data on the seismic record.

The particular detecting heads, one on each drum, for feeding out the delay line recorded seismic signals are selected by means of a programming section. Since it is desired to make static time corrections as well as dynamic corrections, it is clear that the delay introduced by one detecting head for a portion of a seismic trace will not be appropriate for successive portions of that same trace. To compensate for this changing delay time, the programmer stores switching time and delay time information for each trace of the seismic record and feeds this information to the inhibit and gate circuit associated with the detecting heads thereby permitting the detecting heads corresponding to the delay time to feed signals out at the selected switching times. By means of this system, all of the traces on a seismic record may be statically and dynamically time corrected to be in alignment with any given trace selected as the reference trace.

Accordingly, it is a principal object of this invention to provide a method and apparatus for making static and dynamic corrections to recorded data whereby the corrected data may be presented in a more usable form.

Another principal object of this invention is to provide a method and apparatus for making static and dynamic time corrections to seismic data in order that the data may be transferred to a cross-sectional chart in time-corrected form.

It is another object of this invention to provide a system for automatic sequential playback of reproducibly recorded data in order to obtain data corrected to a common time base.

It is another object of this invention to provide a system for automatic sequential playback of magnetically recorded seismic data in order to obtain seismic data corrected to a common time base.

It is a further object of this invention to provide a system for automatic multi-channel playback of reproducibly recorded data in order to obtain data corrected to a common time base.

It is a still further object of this invention to provide a novel magnetic drum and detector head arrangement whereby time corrections may be made to recorded seismic data with the smallest number of detecting heads consistent with the accuracy of incremental time delays required in seismic work.

A still further object of this invention is to program switching time and delay time information to a magnetic delay line unit in order that magnetically recorded seismic data traces may be statically and dynamically time-corrected to a reference trace.

The above objects will be clarified and other objects made known from the following discussion when taken in conjunction with the drawings in which:

FIGURE 5 is a view in two parts of a segment of a seismic record, FIGURE 5a showing the center trace and the outer two traces before the time corrections have been made and FIGURE 5b showing the seismogram produced by time-correcting the traces of the seismogram to a common reference trace.

Figure 1:
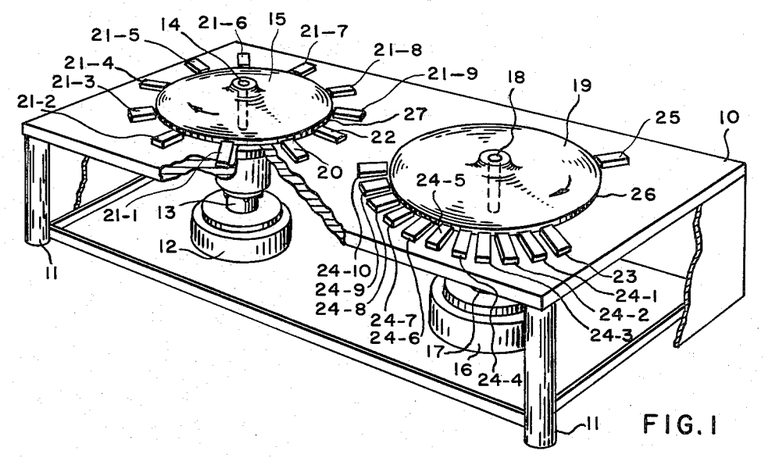
FIGURE 1 is a view perspective of the preferred embodiment of the magnetic delay line of this invention.

Referring now to the drawings, FIGURE 1 illustrates the preferred embodiment of the magnetic delay line of this invention. In FIGURE 1, the rectangularly shaped support plate 10 is supported by the legs 11, one at each corner of the plate. Fastened to the underneath side of plate 10 is a motor support and shaft bearing arrangement 13 which supports the constant speed motor 12 and provides a bearing for the motor output shaft 14. Shaft 14 extends through a circular opening (not shown) in plate 10 and drum 15 is affixed to the shaft 14 so as to be supported at a slight distance above the top surface of plate 10. In like manner, a second motor support and bearing arrangement 17 is affixed to the underneath side of plate 10 and supports motor 16 therefrom. Motor 16 is likewise a constant speed motor but it rotates at a higher r.p.m. than does motor 12. The output shaft 18 of motor 16 similarly extends through a circular opening (not shown) in plate 10 and a second drum 19 is supported by shaft 18 at a slight distance above the upper surface of plate 10. The peripheral edge 27 of drum 15 is coated with a magnetic oxide and positioned in close proximity thereto is a record head 20, detector heads 21–1 to 21–9 and an erase head 22. Similarly, the peripheral edge 26 of drum 19 is coated with a magnetic oxide and positioned in close proximity thereto is a record head 23, detector heads 24–1 to 24–10 and an erase head 25. For purposes of clarity, the signal leads for the various record and detector heads are shown in FIGURE 2 rather than in FIGURE 1.

The detector heads, designated generally by the numerals 21 and 24, are equally spaced from each other and the record heads 20 and 23 around the circumference of their respective drums 15 and 19, but it will be noted that the detector heads 21 are arcuately spaced to a greater distance from each other than are the detector heads 24. Further, it will be noted from the description above that the motor 16 rotates at a faster constant speed than does motor 12. Consequently, it follows that signals recorded by head 20 will be detected by the detector heads 21 with a greater time delay than will the signals recorded by head 23 and detected by detector heads 24. Designating the increments of time between the detector heads of drum 15 as $\Delta t_s$ and the increments of time between the detector heads of drum 19 as $\Delta t_f$, the two drum arrangement can be made to provide the smallest time delay increments desired in seismic work with the minimum number of detector heads by making $n_f \times \Delta t_f = \Delta t_s$, where $n_f$ is the number of heads on the faster drum. In seismic work, the smaller increment of time desired is equal to or less than one millisecond while the over-all delay provided should be at least one hundred milliseconds. These parameters for seismic work are met in the two drum system described by rotating drum 15 at 600 r.p.m. and spacing the detector heads 21 arcuately 36° apart around the periphery of the drum and by rotating drum 19 at 1800 r.p.m. and spacing the detector heads 24 arcuately 10.8° apart around the periphery of the drum. Thus, the $\Delta t_s$ between the detector heads 21 is ten milliseconds and the $\Delta t_f$ between the detector heads 24 is one millisecond and the over-all maximum delay of one hundred milliseconds is provided by nine $\Delta t_s$ detector heads around drum 15 and ten $\Delta t_f$ heads around drum 19. As will appear from the subsequent discussion of FIGURE 2, the single trace of data recorded by head 20 on the magnetizable material of drum 15 is detected by heads 21 and fed to recording head 23 of drum 19 where the data is again recorded and subsequently detected by heads 24. Of course, erase heads 22 and 25 prevent any signals recorded on their respective drums from re-appearing under the record heads.

It should be recognized that the type of magnetic delay line used in the system of this invention is not limited to the two drum delay line shown in FIGURE 1. While not as advantageous, a single drum with a large number of heads spaced around the periphery thereof could be used to provide the one millisecond time delays, the number of heads used in the single drum configuration being equal to the maximum delay in milliseconds desired for the system. Nor is this invention to be considered as limited to the single trace of data which can be time-corrected by the two drum system of FIGURE 1 during any one playback operation. If it is desired to time-correct a plurality of data traces during a single playback operation, the drums 15 and 19 can be expanded into a cylindrical form and a plurality of sets of record, detector, and erase heads positioned around the cylinder, the opeartion with plural sets of heads being the same as that described.

Figure 2:
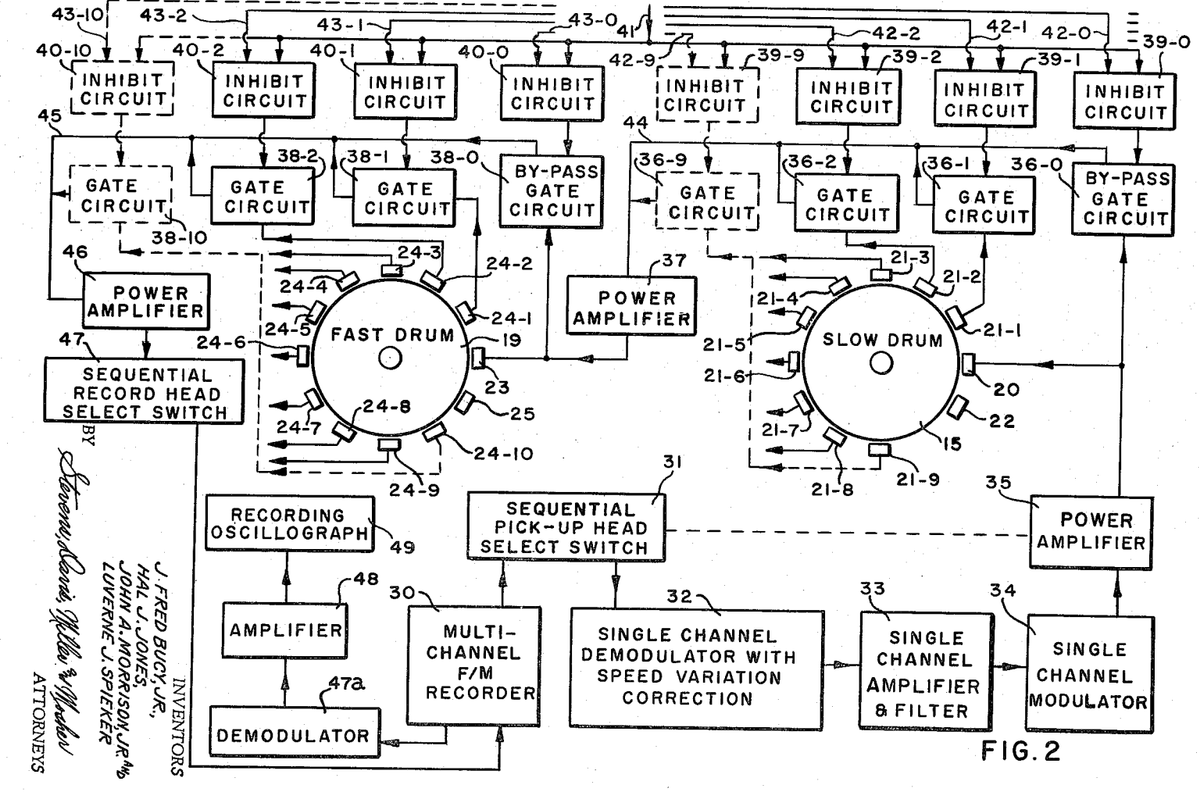
FIGURE 2 is a view illustrating in block diagram form the input to and the output from the magnetic delay line of FIGURE 1 together with the control circuitry for each of the detecting heads.

Referring now to FIGURE 2, the delay line of FIGURE 1 is shown in block diagram form together with the data input to and the output from the delay line and its associated control circuitry. Like parts in both figures are designated by the same numbers with drum 15 being further designated as the slow drum and drum 19 as the fast drum. As has already been pointed out, the preferred embodiment of the magnetic delay line produces time delays for only a single set of data in any one playback operation. The set of data recorded on slow drum 15 by recording head 20 is a trace of seismic data which has been reproduced from a trace on a magnetic recorder. A type of magnetic recorder especially adapted for use with the system of this invention is the magneDISC manufactured by Houston Technical Laboratories of Houtson, Texas. The seismic signals detected at a number of seismometer stations, for example twenty-four, are recorded in frequency modulated form by the magneDISC on twenty-four side-by-side traces on a disk.

In order to time correct such a seismic record, a sequential select switch 31 automatically connects the output of each pickup head on the magnetic recorder 30, one trace at a time, with a demodulator 32. The demodulated seismic signals are then fed to an amplifier and filter 33 which serves to filter out the undesirable noise frequencies and amplify the filtered signals. The amplified and filtered signals are then again frequency modulated by modulator 34 and amplified in power amplifier 35 before being fed to record head 20 of slow drum 15. It should be recognized at this point that, if the signal is not to be filtered and amplified through block 33, the sequential select switch 31 may feed the selected trace signals directly to power amplifier 35 and therefore bypass the demodulator 32 and modulator 34. Further, although the magnetic recorder adapted for use with this system employs FM recording techniques, this invention should not be construed as limited to the use of any particular method of recording seismic signals.

The manner in which the seismic traces are delayed with respect to a reference trace in order to bring all of the traces into alignment is accomplished in the magnetic delay line by receiving the recorded signals from, at most, only one detector head of each drum at any one given instant of time. The selection of the output from only one detecting head on each of the slow and fast drums requires a switching time signal as well as a delay time signal. The switching time signal and delay time signals are provided by the programmer section of FIGURE 3 which is discussed in detail below. The switching time information is fed by lead 41 from the programmer section to a number of inhibit circuits, the inhibit circuits connected with the detector heads 21 of the slow drum being designated by the numbers 39–0 to 39–9 and the inhibit circuits connected with the detector heads 24 of the fast drum being designated by the numbers 40–0 to 40–10. An inhibit circuit is one which requires one input signal to be present before another input signal is received and both inputs are necessary in order for the inhibit circuit to produce an output. The second input to the inhibit circuits, numbered generally as 39 and 40, is the delay time information and this information is supplied from the slow drum and fast drum head selecting circuits of the programmer section. The delay time signals from the slow drum head selecting circuit are fed through individual leads, designated generally by the numeral 42, to each slow drum inhibit circuit so that lead 42–0 is connected to inhibit circuit 39–0, lead 42–1 is connected with inhibit circuit 39–1, etc. The individual delay time signal leads, designated generally by the numeral 43, from the fast drum head selecting circuit are connected with each of the fast drum inhibit circuits, lead 43–0 being connected with inhibit circuit 40–0, lead 43–1 being connected with inhibit circuit 40–1, etc. It follows from this arrangement that switching time information is presented at all of the inhibit circuits, both for the slow and fast drums, simultaneously but that delay time information is presented only to a particular inhibit circuit or circuits.

The inhibit circuits 39 provide an output pulse to the gate circuits 36 and the gate circuits 36 in turn are connected with the recorded signals from detector heads 21, the dash numerals indicating the manner of connection. For example, the output pulse from inhibit circuit 39–1 is fed to gate circuit 36–1 and the output of detector head 21–1 is fed to gate circuit 36–1. In like manner, the inhibit circuits 40 are connected with the gate circuits 38 and the gate circuits are in turn connected with the recorded signals from detector heads 24, the dash numerals indicating the components connected. In the inhibit circuits of this invention, magnetic cores with an approximately square hysteresis curve are used, the characteristics of the cores being generally the same as those described for the cores in the article on "Pulse Switching Circuits Using Magnetic Cores," page 570, May 1955 issue of Proceedings of the IRE. Each magnetic core is wound with three coils; one coil receives times switching pulses from line 41, a second coil receives time delay signals from one of the lines 42 or 43, and the third coil feeds the output pulse from the magnetic core to its associated gate circuit.

As is well-known in the computer art, when a magnetic core is positively magnetized, it is in the One state and when it is negatively magnetized, it is in the Zero state. The delay time signals through either one or both of the lines 42 or 43 serve to magnetize positively the magnetic cores of their respective inhibit circuits to the One state. Then, when a negative time switching pulse from line 41, known as an interrogation pulse, interrogates a positively magnetized magnetic core, the magnetic core becomes negatively magnetized or converted to the Zero state and there is a negative output pulse from the magnetic core. However, if the magnetic core is not positively magnetized, a negative interrogation pulse will cause no change in its magnetization state and there will be no output pulse. Therefore, only those inhibit circuits 39 or 40 which have received both a time delay signal and an interrogation or switching pulse will produce an output pulse. This pulse is fed to its associated gate circuit which consists of a double triode tube, connected as a flip-flop circuit, and a gating triode tube.

One side of the double triode flip-flop is normally conducting and produces a signal to bias the gating triode tube to cutoff. When the negative pulse from the inhibit circuit is received at the normally conducting side of the flip-flop circuit, two different effects occur. First, the circuit flips and the normally conducting side produces a positive pulse which removes the cutoff bias on the gating triode. The gating triode is then in a condition to receive signals from its associated detector head. Second, as the circuit flips, the second side of the flip-flop triode begins conducting, producing thereby a negative pulse. This negative pulse is fed (by means not shown) to each of the other gate circuits and, if any other gate circuit is conducting, the negative pulse serves to flip the gate back to its normally conducting side and its gating triode is thus biassed to cutoff.

The seismic signals passed by any of the gating circuits 36 are fed into a common lead 44, through power amplifier 37 and then to recording head 23 of the fast drum. The detector head of the fast drum whose gate circuit has received the proper delay time and switch time signals will pick up the signals recorded by head 23 and the signals will then be fed through its gate circuit into the comon lead 45. From there, the signals are fed through a power amplifier 46. To illustrate the path of a recorded signal through the slow and fast drums, consider for example a desired delay time of twenty-one milliseconds at a particular instant on the seismic record. In this instance a time delay pulse for a time of twenty milliseconds will be fed to inhibit circuit 39–2 and gate circuit 36–2 so that the recorded signals from detector head 21–2 will be fed through the gating circuit, into lead 44 and through power amplifier 37 to record head 23. In the fast drum portion, the increment of time delay is one millisecond and therefore, a delay time pulse for a time of one millisecond will be fed to inhibit circuit 40–1 and gate circuit 38–1 to operatively connect the recorded signals picked up by head 24–1 into lead 45. Of course, if the time delay is zero, the signal will not be recorded on either the slow or fast drums but will be bypassed through the bypass gates 36–0 and 38–0 into lead 45. Further, if the delay is less than ten milliseconds, the signal will be bypassed through bypass gate 36–0 and recorded on the fast drum and the detector head providing the delay for less than ten milliseconds operatively connected to detect and feed the signal into line 45.

From the signal power amplifier 46, the time-corrected signals are fed to another sequential select switch 47. Sequential select switch 47 is connected with the magnetic recorder 30 and feeds the time-corrected seismic signals onto one of a set of tracks of the magnetic recording medium which contains no previously recorded signals. The described time-correction operation is repeated for each seismic trace recorded on the magnetic recorder 30 until all twenty-four traces have been appropriately delayed to the reference trace and re-recorded on a previously unused track of the magnetic recorder. At this time, all of the twenty-four traces can be detected simultaneously and fed through an appropriate demodulator 47a and amplifier 48 and recorded in visual form by means of a multi-channel recording oscillograph 49.

The delay times needed to time-correct a seismic record are as previously discussed, both static and dynamic in nature. The static time delay is constant along a given seismic trace and, consequently, presents no special problem in programming. However, the dynamic time delay is a different matter since the delay time along a given seismic trace constantly decreases with record time. Therefore, in order to time-correct a seismic record for dynamic time delay, the programmer must provide not only switching times but changing delay times as well.

Figure 4:
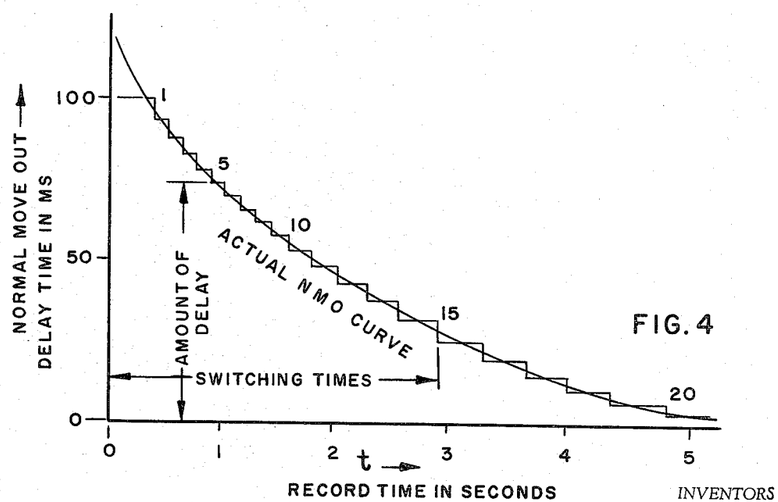
FIGURE 4 is a plot of the delay time in milliseconds against record time in seconds for an actual normal moveout curve with the switching times and delay time approximation to the normal moveout curve provided by this invention shown superimposed thereon.

To illustrate the problem involved in time-correcting a seismic record for dynamic time delay, reference is now made to FIGURE 4 wherein a plot of the delay time in milliseconds against record time in seconds for an actual normal moveout curve is shown. This curve shows that at the start of a record the delay time in seconds is something over one hundred milliseconds but that as the record time increases, the curve drops sharply until at a record time of five seconds the delay time is only a very few milliseconds. In order for the programmer to provide dynamic time delay, it must be capable of introducing different time delays at various times for each record trace of the recording and thus shift between the various detector heads providing the time delay. An approximation to the actual normal moveout curve which can be provided by the programmer of this invention is shown by the step-like curve superimposed thereon. This approximation is accomplished by twenty switching times, numbered in groups of five, of approximately equal time delay. Such an approximation makes the shifts between detector heads at times which most closely follow the normal moveout curve and these shifts cause gaps or replayed sections to appear in the time-corrected record. Since such shifts may be made at a time when an event of interest occurs, it is often more desirable to make the shift between detector heads at times when events of interest are not present even though the resulting approximation may result in deviations at times from the normal moveout curve. The programmer may be easily set to provide switching time and delay time information for both the close approximation of the normal moveout curve as well as for the situation where the switching and delay times are related to the events of interest on a seismic record.

Figure 3:
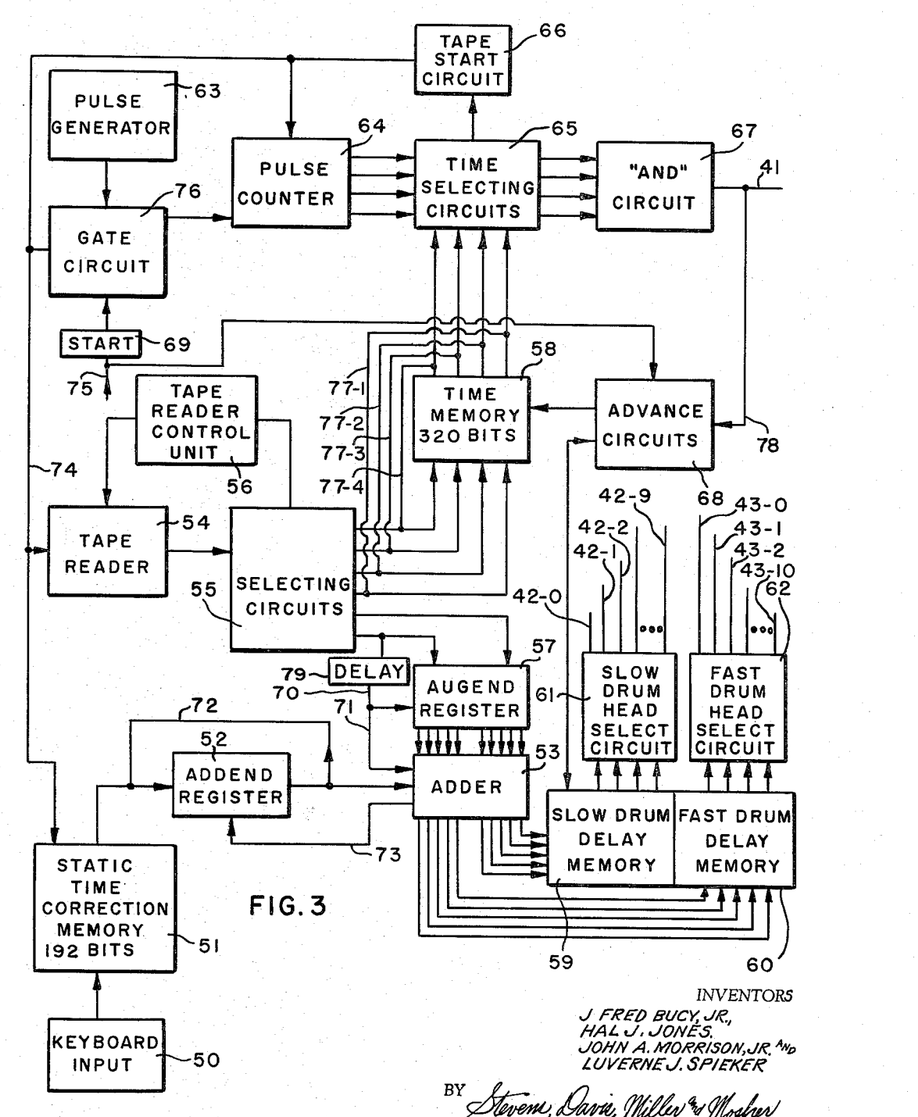
FIGURE 3 is a view in block diagram form of the programmer circuitry illustrating the manner in which switching time and delay time information is stored and fed to the delay line control circuitry of FIGURE 2.

The manner in which the programmer provides switching and delay time information to control the shift between detector heads is shown by the block diagram of FIGURE 3. The programmer is essentially a binary computer in which the static time corrections, constant along a given trace but varying from trace to trace, are introduced by hand for each of the twenty-four traces to be corrected and the dynamic time corrections are introduced by a punched tape. The delay time information to the punched tape is taken from normal moveout curves standard for the area being surveyed, while switching times may be taken either from the normal moveout curves or from visual type records to avoid switching during events of interest. Since the circuits comprising the programmer are well-known in the computer art and the same results may be achieved by any of several different types of circuits, it is considered necessary to mention only the types of circuits used rather than discuss each circuit in detail.

The static time corrections are made by keyboard input 50 to the static time correction memory 51. The static time correction memory 51 contains twenty-four seismic traces in the example of this invention. Each register consists of eight magnetic cores with one set of four cores providing the information bits for delay times of $10^0$ milliseconds and the other set of four cores providing the information bits for relay times of $10^1$ milliseconds. As is well-known, a separate magnetic core is required to store each bit of information. As the information for each trace is fed in by keyboard input 50, the information advances in parallel form until 192 bits of information have been stored in the static time correction memory 51. The dynamic time corrections for each trace are punched out on a paper tape and fed into tape reader 54.

A pulse from tape start circuit 66, which circuit is discussed in detail below, serves to start the tape reader 54 and advance information in the uppermost register of static time memory 51 to an addend register 52. The information in the upper register of memory 51 is fed out in serial form to the shift type of register 52 and from there the information is fed to the adder 53. As the static time information advances to the addend register 52, a seven-hole punched tape is fed to the tape reader 54. Photoelectric cells in the tape reader 54 sense the presence or absence of holes in the punched tape. If there is a hole present in the tape, a pulse is produced in the output. Each photoelectric cell is known as a channel and, thus, a tape reader for reading a seven-hole tape is known as a seven-channel tape reader. Four channels of the seven-channel tape reader carry the operation information as to switching times and as to the amount of delay to be set in on the slow and fast speed drums. The three remaining channels of the seven-hole tape carry address information. The bits of information from the outputs of the seven channels of tape reader 54 are fed in parallel form to the address selecting circuit 55. Address selecting circuit 55 is a circuit in the form of a pyramidal diode matrix or, as perhaps better known, a "switching tree." The address selecting circuit 55 is controlled by three of the seven parallel channels of tape reader 54, known as the address channels. The address selecting circuit 55 is then controlled in such a fashion by the address channels that switching time information is separated from delay time information. The delay time information is stored in the time memory 58 which is composed of shift type magnetic core registers. The switch time information necessary for one switch time consists of four sets of four paralleol bits of information. Consequently, the time memory must consist of sixteen shift registers in parallel. The capacity of each shift register is twenty bits corresponding to the total number of switch points for one trace. It follows that the total number of bits of information stored in the time memory is sixteen times twenty or 320 bits. The sixteen parallel registers of the time memory are broken up into groups of four with each group having its own address. Thus, as the information from the tape reader passes through the address selecting circuit, the operation, or switching time information, is directed to the correct group registers by its address. Once the time memory has been filled, all of the sixteen shift registers are shifted simultaneously such that sixteen parallel bits of information are passed to the time selecting circuits.

A particular delay time consists of two sets of four parallel bits of information. Each set of information corresponds to a decimal digit. The delay time information is separated from the switching time information in the same manner as described above. One set of the four bits of information represents a delay time of the order of $10^0$ milliseconds and the other set of four bits of information represents a delay time of the order of $10^1$ milliseconds. The delay time information is directed to its correct address in augend register 57 by the address selecting circuit. Information is entered into the augend register in a predetermined manner such that the portion of the augend register which stores the binary information corresponding to the order of $10^1$ milliseconds, is filled last. Upon being completely filled, the augend register is automatically advanced feeding the information from the augend register to the adder 53. The pulse which advances the augend register is obtained by combining the input signals to the $10^1$ portion of the augend register by means of a summing circuit and then delaying the resulting pulse by a prescribed amount such that the augend register is filled before the advance signal arrives at the augend register over line 70. This advance pulse is also fed to adder 53 over line 71, which then begins the addition of the dynamic time delay with the static time delay. Adder 53 is a pre-set binary counter and so, adder 53 feeds pulses to the addend register 52 by means of line 73 whereby the static time delay information in the addend register is serially advanced and properly combined with the dynamic time delay information. After the addition of the two delay times, the delay time of the order of $10^1$ milliseconds is fed as four bits of information to the slow drum delay memory 59 and the delay time of the order of $10^0$ milliseconds is fed as four bits of information to the fast drum delay memory 60. The slow and fast drum memories 59 and 60 are both composed of shift type registers.

The punched tape contains information for twenty different switching and dynamic delay times per trace. This information is fed into address selecting circuit 55 until tape reader 54 has read the twenty different sets of information and thereafter the tape reader control circuit 56 operates to stop the punched tape. As these twenty different sets of time information are received, the switching times are fed to the time memory 58 until it is completely filled. The different dynamic delay times are fed through the augend register to the adder 53 where they are added with the constant static delay times. A recirculating line 72 around the addend register 52 is provided so that the information serially fed to the adder 53 is re-stored in the addend register and, thus, constant static times are added with each of the different dynamic delay times. The twenty delay times are stored in the slow and fast drum memories 59 and 60 respectively. Each of the memories stores four bits of information for twenty delay times or eighty bits of information.

The programmer section is set to coincide with the operation of the magnetic recorder 30 and, in the example selected, the magnetic recorder has a recording period of five seconds and a half-second of dead time. The tape start circuit 66 operates at the beginning of the half-second of dead record time to begin the switching time and delay time information storage in the time memory circuit 58 and slow and fast drum delay memories 59 and 60 respectively. At the end of this half-second of dead record time, the information storage is completed and a detector head on the magnetic recorder 30 detects the time break pulse and feeds it to a start circuit 69 through lead 75. The time break pulse is the instant that the explosive charge is detonated and represents the instant from which all time measurements are made on a seismic record. On receiving the time break pulse, start circuit 69 removes the cut-off bias on gate 76 and permits the pulse generator 63 to feed pulses at a frequency of one kilocycle per second to the pulse counter 64. Pulse counter 64 is a conventional binary decade counter with four stages, the first stage counting pulses up to $10^1$, the second stage counting pulses up to $10^2$, the third stage counting pulses up to $10^3$, and the fourth stage counting pulses up to $10^4$.

In addition to feeding the time break pulse to circuit 69, lead 75 simultaneously feeds the time break pulse to advance circuit 68. Advance circuit 68 produces an output pulse to the time memory circuit 58 and the uppermost time switching information stored therein is advanced into the time selecting circuit 65. Time selecting circuit 65 is an inhibit type circuit, which requires, as previously described, one input in advance of a second input but requires both inputs to produce an output. The first input to circuit 65 is the time switching information and, when the pulse counter has counted a number of pulses equal to the switching time information, the second input is received and circuit 65 then produces an output pulse. This output pulse is fed to the "AND" circuit 67. An "AND" circuit is a coincidence circuit requiring an input on each of all inputs to the circuit in order for an output signal to be produced. The inputs to the "AND" circuit are from each of the timing sections of circuit 65. When the inputs are received, "AND" circuit 67 produces a pulse which is fed through line 41 to the inhibit circuits 39 and 40 of FIGURE 2 as an interrogation pulse and through lead 78 to circuit 68 as an advance pulse.

On receiving the output pulse from "AND" circuit 67, circuit 68 produces an output pulse to the time memory circuit 58 and to the slow drum and fast drum delay memory circuits 59 and 60 respectively. The pulse to the time memory circuit advances another set of time switching information into the time selecting circuit 65. It should be pointed out here that the time switching information will be the same throughout a given record. Therefore, leads 77–1 to 77–4 are provided to recirculate each set of timing information fed out of time memory circuit 58 back to its input and thus re-store the switching information for the next trace. The pulse to the memory circuits 59 and 60 advances the delay time information from memory 59 to the slow drum head select circuit 61 and from memory 60 to the fast drum head select circuit 62. The head select circuits 61 and 62 are similar to the address selecting circuit in that they are composed of a diode matrix in the form of a "switching tree." The bits of delay time information fed to the respective "switching trees" selects the detector heads 21 and 24 corresponding to the time delays received at the head select circuits. The detector heads, of course, are connected with the head drum select circuits through their associated inhibit and gate circuits, either 39 and 36 or 40 and 38.

After the programmer has run through the twenty sets of switching and delay time information for each trace, the magnetic recorder has reproduced the recorded seismic signals on a given trace for a period of five seconds and the half-second dead time period is reached. Tape start circuit 66 is an "AND" or coincidence type circuit set to produce an output upon receiving an input from time selecting circuit 65 at the end of 5000 millisecond pulses or five seconds. On receiving the input from circuit 65, tape start circuit 66 produces a pulse which resets the pulse counter 64, cuts off gate circuit 76, starts the next set of trace information feeding into tape reader 54, and advances the static time correction for the next trace from static correction memory 51 to the addend register 52. The cycle begins again with the time break pulse to start circuit 69 and is repeated for all of the twenty-four traces recorded on the magnetic recorder 30.

Figure 5A:
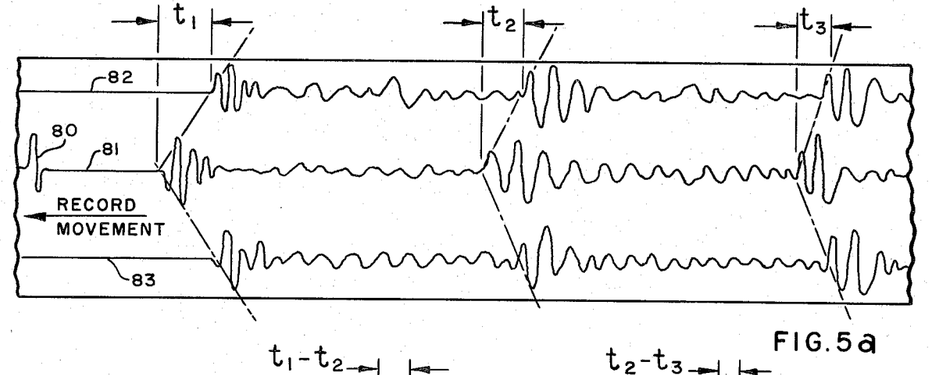
Figure 5B:
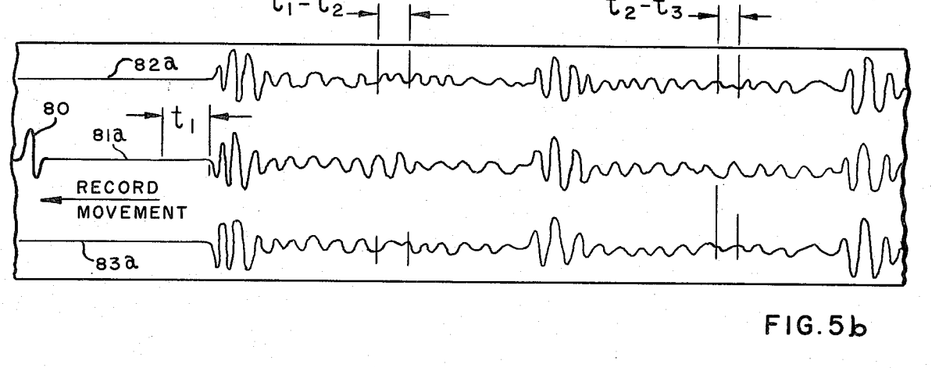

To illustrate the operation of this invention, reference is now made to FIGURE 5 wherein FIGURE 5a shows an uncorrected seismic record and FIGURE 5b shows a seismic record corrected in accordance with the teachings of this invention. The seismic record of FIGURE 5a represents a symmetrical seismic spread with the explosive charge positioned in the center of the spread. At the instant the shot is fired, a time-break pulse is produced and is shown recorded as sharp pulse 80 on the center trace 81 of the record. Since the seismometer producing center trace 81 is closer to the shot than either of the seismometers producing outer traces 82 and 83, the first reflections are recorded on center trace 81 at a time interval $t_1$ earlier than the first reflections recorded on the outer traces 82 and 83. As the next reflection is received from a deeper stratum, the reflection is received on trace 81 at a time $t_2$ earlier than the same reflection is received on traces 82 and 83, the time interval $t_2$ being a lesser time than $t_1$. Similarly for a reflection from even deeper strata, the reflection on the center trace is received at a time $t_3$ earlier than the reflection on the outer traces, $t_3$ being an even smaller time interval than $t_2$.

Assuming that the seismic record of FIGURE 5a has been magnetically recorded and time-corrected in accordance with teachings of this invention, the record of FIGURE 5b is produced. In FIGURE 5b, the center trace 81a is taken as the reference trace and recorded with a time delay of $t_1$ to bring it in alignment with the first reflections received on the two outer traces, 82a and 83a. Trace 81a is thereafter recorded without further time correction. Then, if traces 82a and 83a were to be recorded without any time delay, it can be seen that the second and third reflections would appear in advance of the second and third reflections on the reference trace 81a. Consequently, the programmer is set to switch at a time in advance of the time when the second reflection arrives and with a delay time equal to $t_1$–$t_2$ thereby recording the second reflections on trace 82a and 83a in line with the second reflection on trace 81a. Similarly for the third reflections on the outer traces, the programmer is set to switch at a time in advance of the receipt of the third reflection and provided with a delay time of $t_2$–$t_3$ in order that the third reflections may be recorded in line with the third reflection on the trace 81a. It will be noted that, at the points where switching occurs and a delay time is introduced, a portion of the record is replayed. However, if the outer traces were being corrected to the center trace, portions of the outer traces would be omitted. Therefore, for this reason, it is advantageous to provide switching times during portions of the record which will not result in the elimination of events of interest from the record.

This invention has been described in terms of the preferred embodiment, but it is obvious that numerous changes and modifications could be made to the disclosed system and still provide statically and dynamically time-corrected data. Accordingly, all changes and modifications which fall within the scope of the appended claims are claimed as part of this invention.

What is claimed:

1. Delay line apparatus comprising a first magnetic medium rotating at a constant speed, a record head for magnetically recording signals on said first medium, a plurality of detecting heads equally spaced from each other around said first medium to provide large delay time intervals, a second magnetic medium rotating at a higher constant speed than said first medium and receiving detected signals therefrom, a record head for recording signals on said second medium and a plurality of detecting heads equally spaced from each other around said second medium to provide small time delay intervals.

2. Delay line apparatus as defined in claim 1 wherein said small delay time intervals provide a vernier for said large delay time intervals.

3. Apparatus for statically and dynamically time correcting data comprised of two delay lines for magnetically recording data, detecting heads spaced along each of said delay lines providing large time delays in detecting said data recorded on one of said delay lines and small time delays in detecting data recording on the other said delay lines, and a programmer feeding switching time and delay time information to circuit means individually connected to each of said detecting heads whereby said recorded data is received from the detecting heads corresponding to said delay time information.

4. Apparatus for statically and dynamically time correcting seismic data comprised of a two drum delay line for magnetically recording seismic data, detecting heads spaced along each drum of said delay line providing large time delays in detecting said seismic data recorded on one of said drums and small time delays in detecting said seismic data recorded on the other said drums, and a programmer feeding switching time and delay time information to circuit means individually connected to each of said detecting heads whereby said recorded seismic data is received from the detecting heads corresponding to said delay time information.

5. Apparatus for statically and dynamically time correcting seismic data as defined in claim 4 wherein said other drum rotates at a higher constant speed than said one drum.

6. Apparatus for statically and dynamically time-correcting seismic data as defined in claim 4 wherein said programmer is a digital computer providing switching time and delay time information in digital form.

7. Apparatus for statically and dynamically time correcting seismic data comprised of a first magnetic delay line for recording seismic data, detecting heads spaced along said first delay line to provide large time delays in detecting the data recorded thereon, a second delay line for magnetically recording data received from said first delay line, detecting heads spaced along said second delay line to provide small time delays in detecting the data recorded thereon, and a programmer feeding switching time and delay time information to circuit means individually connected to each detecting head spaced along said first and second delay lines whereby said recorded data is received from the detecting heads corresponding to said delay time information.

8. Delay line apparatus as defined in claim 1 wherein the peripheral spacing of the detecting heads around said second medium is equal to the peripheral spacing of the detecting heads around said first medium.

9. Delay line apparatus as defined in claim 1 wherein the detecting heads around said second medium are spaced more closely than the detecting heads around said first medium.

10. Delay line apparatus comprising a first magnetic medium rotating at a constant speed, a record head for magnetically recording signals on said first medium, a plurality of detecting heads equally spaced from each other around said first medium to provide large delay time intervals, a second magnetic medium rotating at the same constant speed as said first medium and receiving signals therefrom, a record head for recording said signals on said second medium, and a plurality of detecting heads spaced around said second medium, said space therebetween being smaller than the space between said detecting heads around said first medium to provide small time delay intervals.

11. Apparatus for time-correcting seismic data comprising a delay line for reproduceably recording seismic data, a plurality of detecting heads spaced along said delay line, switching means associated with said heads for switching from head to head to provide time delays for said seismic data, and means for receiving time-correction information for said seismic data and for deriving therefrom time delay control signals which condition said switching means, whereby the recorded seismic data is read from said detecting heads in accordance with said time delay control signals.

12. Apparatus for statically and dynamically time-correcting seismic data comprising a delay line for reproduceably recording seismic data, a plurality of detecting heads spaced along said delay line, switching means associated with said heads for switching from head to head to provide time delays for said seismic data, means for receiving static time correction information for said seismic data, means for receiving dynamic time correction information for said seismic data, and means for algebraically combining said static and said dynamic time correction information to produce time delay control signals which condition said switching means, whereby the recorded seismic data is read from said detecting heads in accordance with said time delay control signals.

References Cited in the file of this patent

UNITED STATES PATENTS

| | | |
|---|---|---|
| 2,243,730 | Ellis | May 27, 1941 |
| 2,406,353 | Myers | Aug. 27, 1946 |
| 2,539,556 | Steinberg | Jan. 30, 1951 |
| 2,620,890 | Lee et al. | Dec. 9, 1952 |
| 2,672,944 | Minton | Mar. 23, 1954 |
| 2,800,639 | Lee | July 23, 1957 |
| 2,879,860 | Tilley | Mar. 31, 1959 |

OTHER REFERENCES

Jones et al.: "Geophysics," October 1955, pp. 745–765.